Aug. 29, 1950     O. V. JOHNSON     2,520,639
GROOVING TOOL
Filed May 16, 1945     3 Sheets-Sheet 1
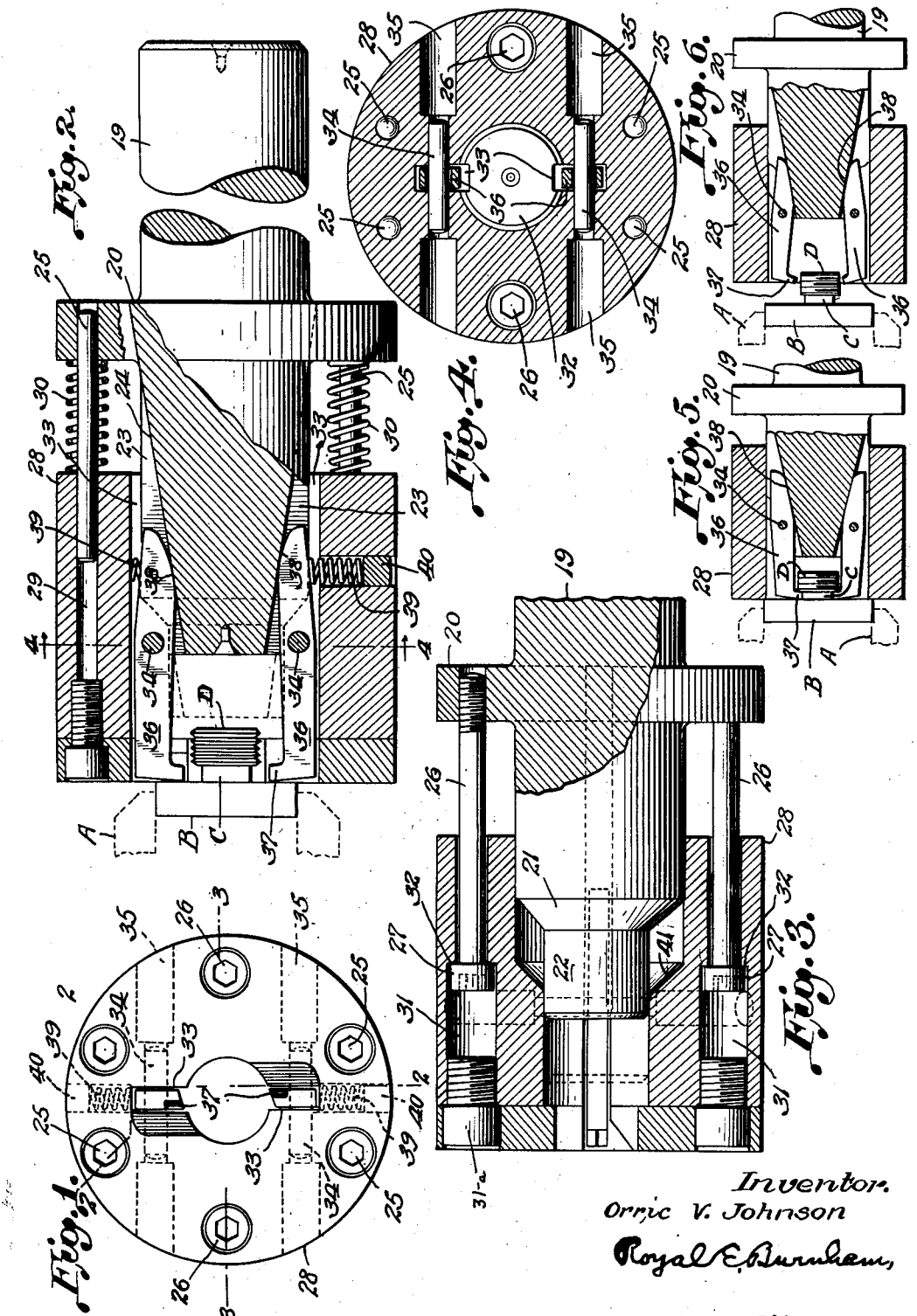
Inventor.
Orric V. Johnson
Royal E. Burnham,
Attorney.

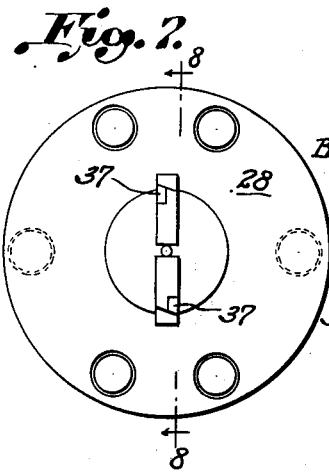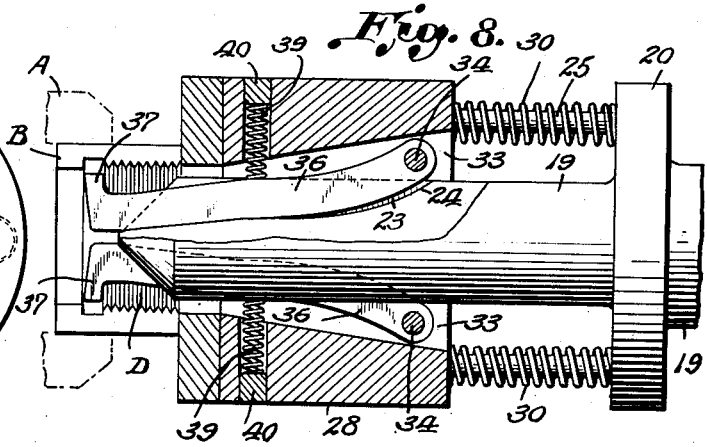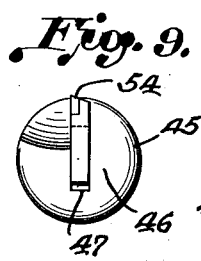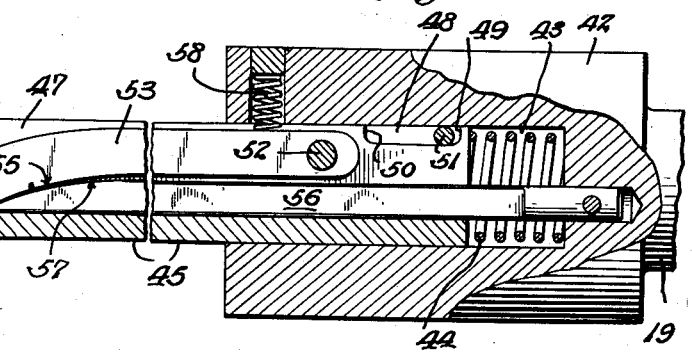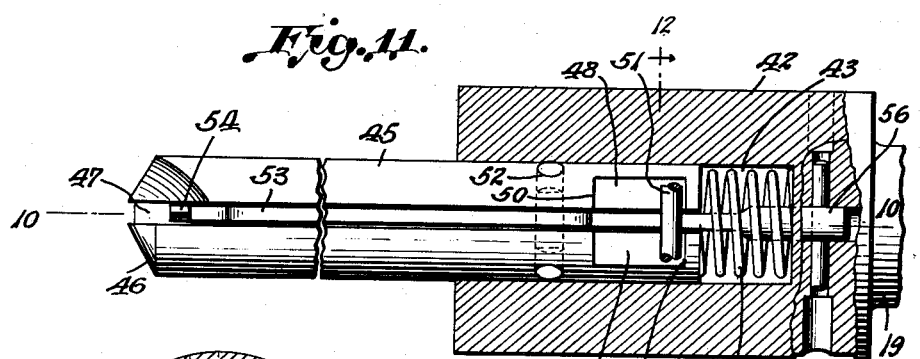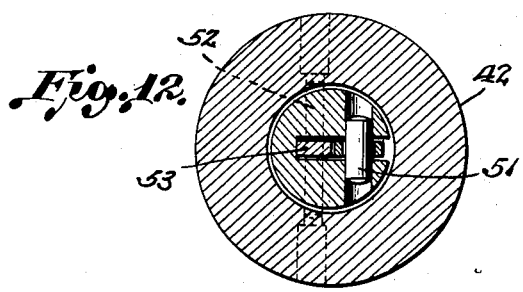

Aug. 29, 1950     O. V. JOHNSON     2,520,639
GROOVING TOOL
Filed May 16, 1945     3 Sheets-Sheet 3
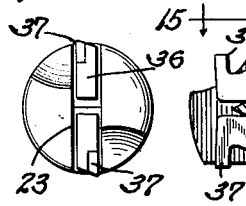
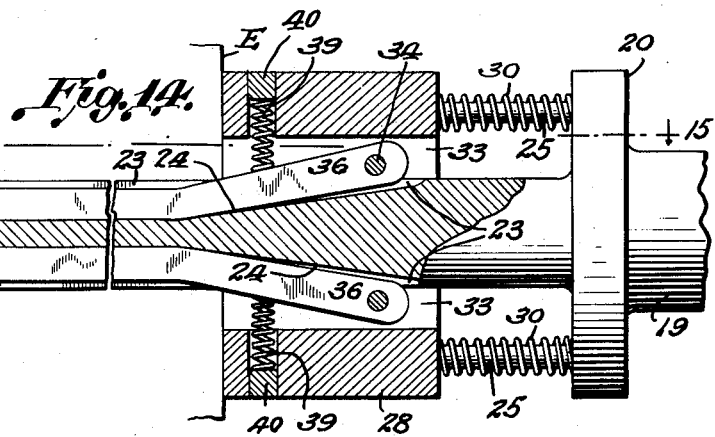
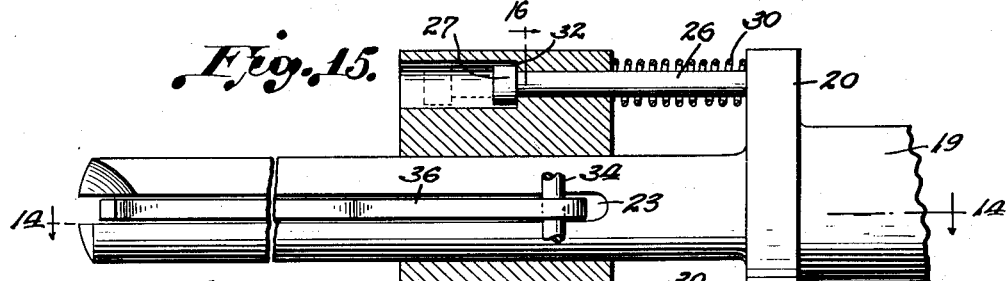
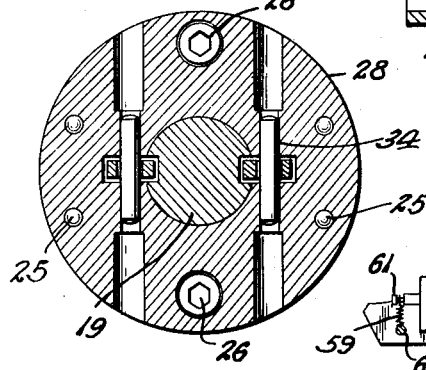
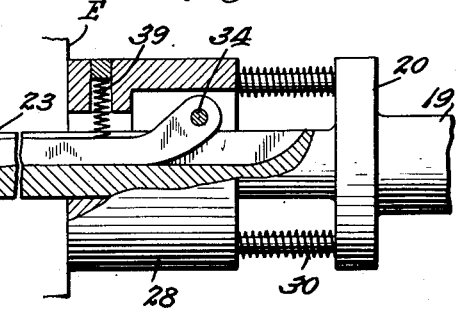
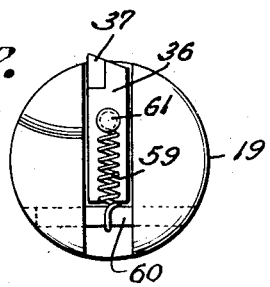
Inventor.
Orric V. Johnson
Royal E. Burnham,
Attorney.

Patented Aug. 29, 1950

2,520,639

UNITED STATES PATENT OFFICE 2,520,639

GROOVING TOOL

Orric V. Johnson, Erie, Pa.

Application May 16, 1945, Serial No. 594,068

2 Claims. (Cl. 77—58)

This invention relates to tools for forming grooves and for undercutting in work in which it operates.

A tool in accordance with the invention is particularly for use on types of machines that have insufficient dwell to permit use of the ordinary outside necking or grooving tool usually operating from the side. The invention also provides tools for formation of annular grooves inside of work, for undercutting at bottom of deep holes, and for undercutting deep holes without bottom.

It is an object of the invention to provide tools of this character in which parts are so formed and arranged that the cutters thereof remain out of contact with the work and thus inactive until they reach the place at which grooving or undercutting is to be performed and in which the cutters then are fed automatically into the work.

Another object of the invention is to provide a tool in which the cutters automatically are backed from the work before release of the tool itself from the work.

Therefore, the cutters span, clear, and do not act on other parts of the work in reaching and leaving the places of grooving or undercutting.

When considered with the description herein, characteristics of the invention are apparent in the accompanying drawing, wherein adaptations of the invention are disclosed.

Like reference characters refer to corresponding parts in the views of the drawing, of which—

Fig. 1 is an end view of an external cutting tool;

Fig. 2 is a section on line 2—2, Fig. 1;

Fig. 3 is a section on line 3—3, Fig. 1;

Fig. 4 is a section on line 4—4, Fig. 2;

Figs. 5 and 6 are views illustrative of the position of parts when the cutters are, respectively, at completion of cutting action and when the tool is retracting from a piece of work;

Fig. 7 is an end view of an internal cutting tool;

Fig. 8 is a view, mainly in section, on line 8—8, Fig. 7;

Fig. 9 is an end view of another form of internal cutting tool;

Fig. 10 is a section on line 10—10, Fig. 11;

Fig. 11 is a section on line 11—11, Fig. 10;

Fig. 12 is a section on line 12—12, Fig. 11;

Fig. 13 is an end view of still another form of internal cutting tool;

Fig. 14 is a section on line 14—14, Fig. 15;

Fig. 15 is a section on line 15—15, Fig. 14;

Fig. 16 is a section on line 16—16, Fig. 15;

Fig. 17 is an end view of an internal grooving tool having a single cutter;

Fig. 18 is a view, partly in longitudinal section, of a tool having a cutting end as shown by Fig. 17.

Referring to Figs. 1–6, the tool of this invention includes a shaft or spindle 19, which is susceptible of being held and rotated by a machine chuck or other comparable part. The shaft has an annular flange 20, preferably integrally formed thereon, and from the flange the shaft is of uniform diameter to a shoulder or abutment 21, beyond which it extends as a terminal part 22 of smaller diameter.

The shaft has oppositely positioned longitudinal slots 23 in its portion beyond the flange. The bottoms of the slots are cam surfaces 24, which slant toward the shaft axis and toward the free end of the shaft.

Two pairs of oppositely disposed guide rods 25 and a pair of similarly positioned stop rods 26 are fixed in the flange 20 and they are disposed substantially parallel to the shaft axis. The rods 26, which also function as guides, have heads or abutments 27.

A sleeve 28 is slidable longitudinally on the portion of the shaft beyond the flange 20. The sleeve has bores 29 into which the guide rods 25 extend. Springs 30 on the rods 25 are interposed between the flange 20 and the rear end of the sleeve and urge the latter forwardly. The sleeve also has bores 31 into which the rods 26 extend. Each of the bores 31 contains an abutment 32, constituting stops, for contact by the heads 27 of the rods therein to limit forward movement of the sleeve by urge of the springs 30.

The bores 31 of the sleeve are closed at their outer ends by screw plugs 31—a, with which the inner ends of the rods 26 may contact and thus limit the forward movement of the shaft in the sleeve and consequently limit the extent of cutting action of the cutter arms. The amount of that action may be regulated by turning the plugs.

The sleeve has longitudinal oppositely disposed slots 33 opening to its bore. These slots are intersected by pins 34 press fitted into place through holes 35.

Cutter arms 36 in the slots 33 are pivoted between their ends on the pins 34. The arms 36 are formed with cutters 37 at their outer ends. The portions of the cutter arms on the other sides of their pivots have inclined surfaces 38, which are urged against the cam surfaces 24 of the shaft 19 by springs 39, the latter being held in the wall of the sleeve by plugs 40.

The rear portion of the bore of the sleeve 28 is of a diameter to fit the main portion of the shaft 19, it has a reducing shoulder 41 to contact with the shoulder 21 of the shaft, and beyond the shoulder it is of a diameter to fit the terminal part 22 of the shaft.

The parts are so proportioned and related that, when the cutters are in retracted inactive position, they are disposed as shown in Figs. 2 and 6. They are so retained by urge of the springs 39 when the heads 27 of the rods 26 are against the abutments 32.

When the tool is advanced toward a piece of work, the cutters remain in the inactive position until they reach the part of the work to be grooved. When the outer end of the sleeve 28 contacts a face of the work, advance movement of the sleeve stops, but the shaft 19 continues to move forward in the sleeve. The parts are so related that, when the sleeve reaches the work face, the cutters are at the place to be grooved. The following advance of the sleeve, by action of the cam surfaces thereof on those of the cutter arms, swings the cutters against the work until the groove is formed.

Approach of the cutters to and arrival at the cutting position are illustrated by Figs. 6 and 5, respectively, wherein, and also in some other views, a chuck A shown in outline holds a piece of work B, which latter has a protruding part C which is to be grooved between its threaded portion D and the main part of the work.

As the sleeve approaches the face of the work and until it reaches the face, the cutters are spread and clear the threaded part D. When the sleeve contacts the face of the work and its advance thereby is stopped, the shaft continues to advance, and the coacting cam surfaces of the shaft and cutter arms feeds the cutters against the work.

The depth of the groove is governed by limitation of forward movement of the shaft in the sleeve. For a groove of predetermined depth, the range of forward movement of the shaft in the sleeve is that between the shaft shoulder 21 when it is in retracted position and the sleeve shoulder 41, as seen in Fig. 3. The cutting action stops when the shoulders meet.

When the groove is finished, retrograde movement is given to the shaft. During the initial part of that movement, the springs 30 retain the sleeve against the work face and the cutters opposite to the formed groove until the shaft has receded enough in the sleeve to permit the springs 39 to back the cutter from the groove and spread them enough to enable them to be withdrawn clear of part of the work untreated by them, as the threaded part D for example. Fig. 6 shows both the approach and withdrawal position of the cutters.

Action of the cutters is automatic in that they come to their place of action and perform their grooving operation while the shaft advances in the sleeve after the latter contacts a face of the work, and they retract first from the formed groove and then pass other parts of the work without injury thereto during recession of the shaft while it is rotating.

Although the tool has been described as rotating and reciprocating while in use, it is to be understood that its functioning is equally automatic and efficient when it is on-reciprocal and the work moves to and from it, and whether either the tool or work rotates.

An adaptation of the invention in an internal grooving tool is shown by Figs. 7 and 8. Therein the shaft 19 and the sleeve 28 are associated in a manner similar to those of the outside groover. However, the cutter arms 36 are pivoted at their inner ends in the sleeve slots 33, and the cutters 37 at the outer ends of the arms are outwardly disposed.

As with the outside groover, when the sleeve comes to the face of the work, the shaft, continuing its advance in the sleeve, causes the cutter arms to feed the cutters to the work. After completion of the groove, the cutters clear the groove and other parts of the work in a manner similar to that of the outside cutting tool.

A tool, in accordance with this invention, for undercutting at or near the bottom of holes, is illustrated by Figs. 9, 10, 11, and 12. In this form the shaft 19 has an enlarged head 42 as a part thereof. The head contains a longitudinal chamber 43, which is open at its end and is coaxial with the shaft.

A spring 44 in the inner end of the chamber urges outwardly a bar member 45, which is reciprocable in the chamber and extends outside thereof to a contact end 46. That member has a longitudinal slot 47 opening to its perimeter. The member also is cutaway at its perimeter, as shown at 48, to provide spaced abutments or shoulders 49 and 50. A pin 51, fixed in the head 42, extends transversely between the abutments and by contact therewith limits longitudinal movement of the bar 45 in the head.

The member 45 has a transverse pivot pin 52 fixed therein, and thereon an elongated cutter arm 53 in the slot 47 is mounted at one end. The cutter arm has an outwardly disposed cutter 54 on its outer end, which is positioned inside of the contact end 46 of the member 45. The cutter arm also has a cam surface 55 on its side opposite to the cutter 54. An elongated cam member 56, as a part of the shaft 19, is fixed at one end in the shaft, and it extends alongside of the cam surface of the cutter arm, where it has a cam surface 57. The cutter arm is urged against that surface by a spring 58.

The parts have inactive positions as shown by Figs. 10 and 11, the stop 51 preventing the spring 44 from pushing the member 45 outwardly.

When it is desired to undercut at or near the bottom of a hole, the parts of the tool protruding from the head 42 are moved into the hole. When the end 46 of member 45 reaches the bottom of the hole, advancing movement of the member 45 and of the cutter arm 53 cease, but the head continues to be pushed forwardly.

This causes the cam member 56 of the shaft to spread and feed the cutter against the wall of the hole and to form a groove of the depth desired. The distance between the abutments 49 and 50 is such that the pin 51 reaches the forward one of them and stops the forward action of the cam member 56 on the cutter arms and thus action of the cutters when a groove of the desired depth is formed.

Upon completion of the undercut, the head 42 and the cam member 56 therein are permitted to recede with respect to the member 45, with the result that the spring 58 swings the cutter arm 53 and draws the cutter from the groove. Thereupon the tool can be removed from the work.

Figs. 13, 14, 15, and 16 illustrate another form of internal grooving or undercutting tool, which is capable of cutting laterally in holes without bottom and in bottomed holes above the bottom. This form is similar in its principles of operation to those of Figs. 1–6 and 7 and 8, but it differs in detail.

It includes a sleeve 28, which is slidable on the shaft 19. The shaft with its cam bottomed slots 23 extends, however, as a bar-like member outside of the sleeve, and it is of a size to enter and to support elongated cutter arms 36 in a hole in which cutting is performed. Functioning of the parts is similar to the forms of Figs. 1–6 and 7 and 8 during advance of the tool to the face of the work (indicated by line E in Fig. 14), during the immediately ensuing cutting operation in the hole, and during recession of the tool beginning with back-off of the cutters from the formed groove.

A single cutter form of grooving tool similar to that of Figs. 13-16 is shown by Figs. 17 and 18, the line E in Fig. 18 indicating face of work. An elongated cutter arm 36, pivoted in the sleeve 28, extends outside thereof in the slot of the spindle, which projects beyond the sleeve and supports the cutter arm.

Because of the relative proximity of the cutter arm urging spring 39 to the pivotal point of the arm, a spring 59, which also urges the arm against the cam bottom of the shaft slot, is attached to the end of the shaft by a pin 60 and to a projection 61 on the end of the cutter arm. The spring 59 supplements the retractive urge of the spring 39 on the relatively long cutter arm.

I claim:

1. A grooving tool comprising a shaft having a longitudinal cam-bottomed slot, a sleeve reciprocable on said shaft and having a bore containing an abutment, an adjustable plug closing one end of said bore, a rod fixed on said shaft extending into said bore through the other end and contactable at its inner end with said plug, an abutment on said rod contactable with said bore abutment, a cutter arm pivotally mounted on said sleeve and positioned in said shaft slot, a spring urging said arm against the bottom of said slot, and another spring urging said sleeve outwardly on said shaft.

2. A grooving tool comprising a shaft containing a longitudinal chamber, a supporting member longitudinally slotted in one side slidable in said chamber and extending outside thereof and formed to enter a hole, a cutter arm pivoted in the slot of said member near one end at a place inside of said chamber and having a cam surface near its other end, an elongated cam member fixed to said shaft and extending therefrom between the bottom of said slot and said cutter arm, and having a cam surface cooperable with that of said cutter arm, a spring urging that arm against said cam member, another spring urging said slotted member outwardly, and a stop limiting that movement at an inactive position of said cutter arm.

ORRIC V. JOHNSON.

REFERENCES CITED

The following references are of record in the file of this patent:

UNITED STATES PATENTS

| Number | Name | Date |
| --- | --- | --- |
| 578,805 | Annable | Mar. 16, 1897 |
| 1,530,593 | Calkins | Mar. 24, 1925 |
| 1,922,630 | Oberhuber | Aug. 15, 1933 |
| 2,040,761 | Rothschmitt | May 12, 1936 |
| 2,115,319 | Roye | Apr. 26, 1938 |
| 2,214,484 | Seal | Sept. 10, 1940 |
| 2,333,935 | Jones | Nov. 9, 1943 |
| 2,356,402 | Haynes | Aug. 22, 1944 |
| 2,401,074 | Huelster | May 28, 1946 |